Dec. 17, 1940.  V. POMERNACKI  2,225,423
AUTOMOBILE FOOT PEDAL SAFETY CONTROL
Filed Sept. 12, 1939  2 Sheets-Sheet 1
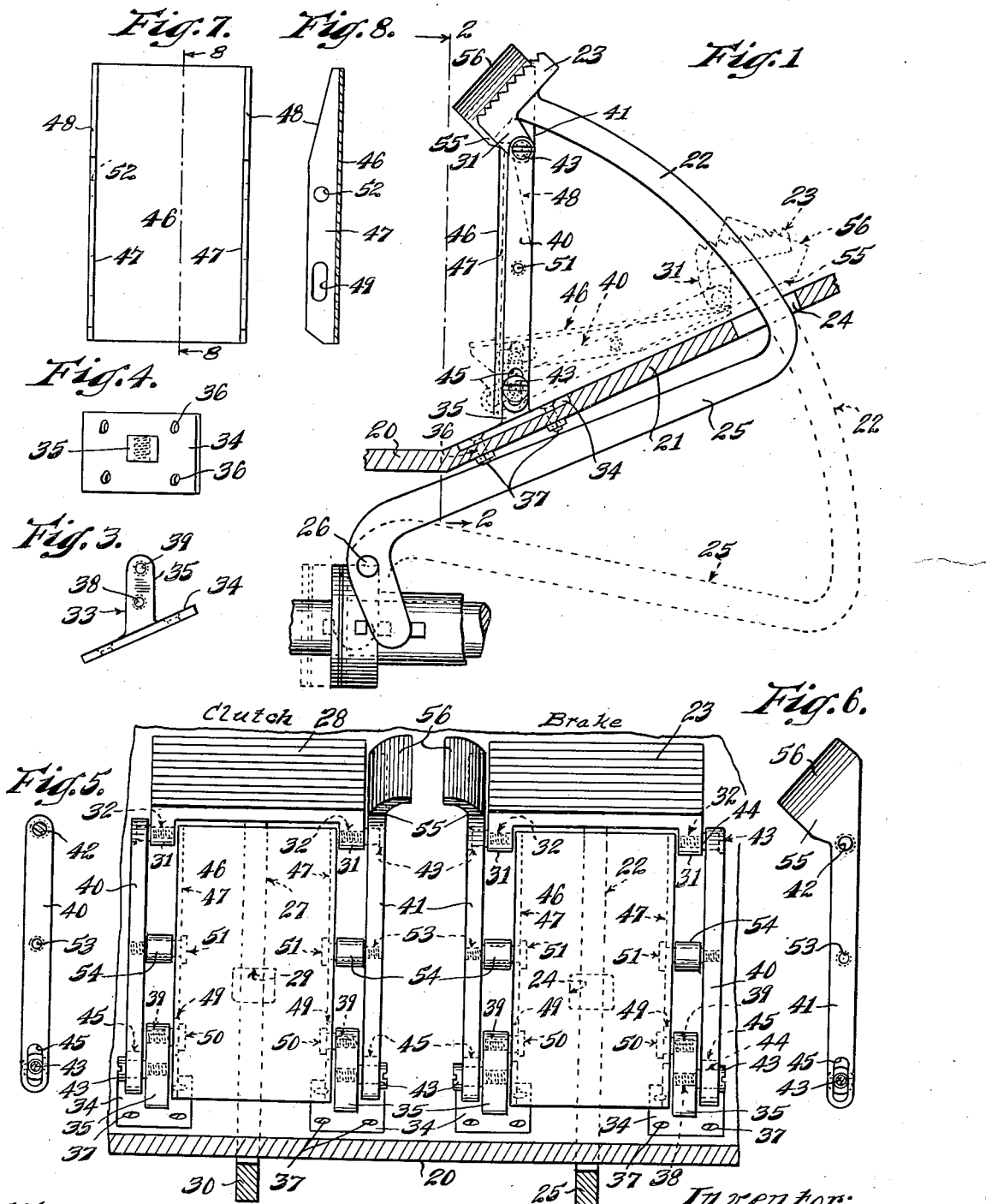
Witnesses:
E. E. Wessels
Janet McKay
Inventor:
Valerius Pomernacki,
By Joshua R. H. Potts
His Attorney.

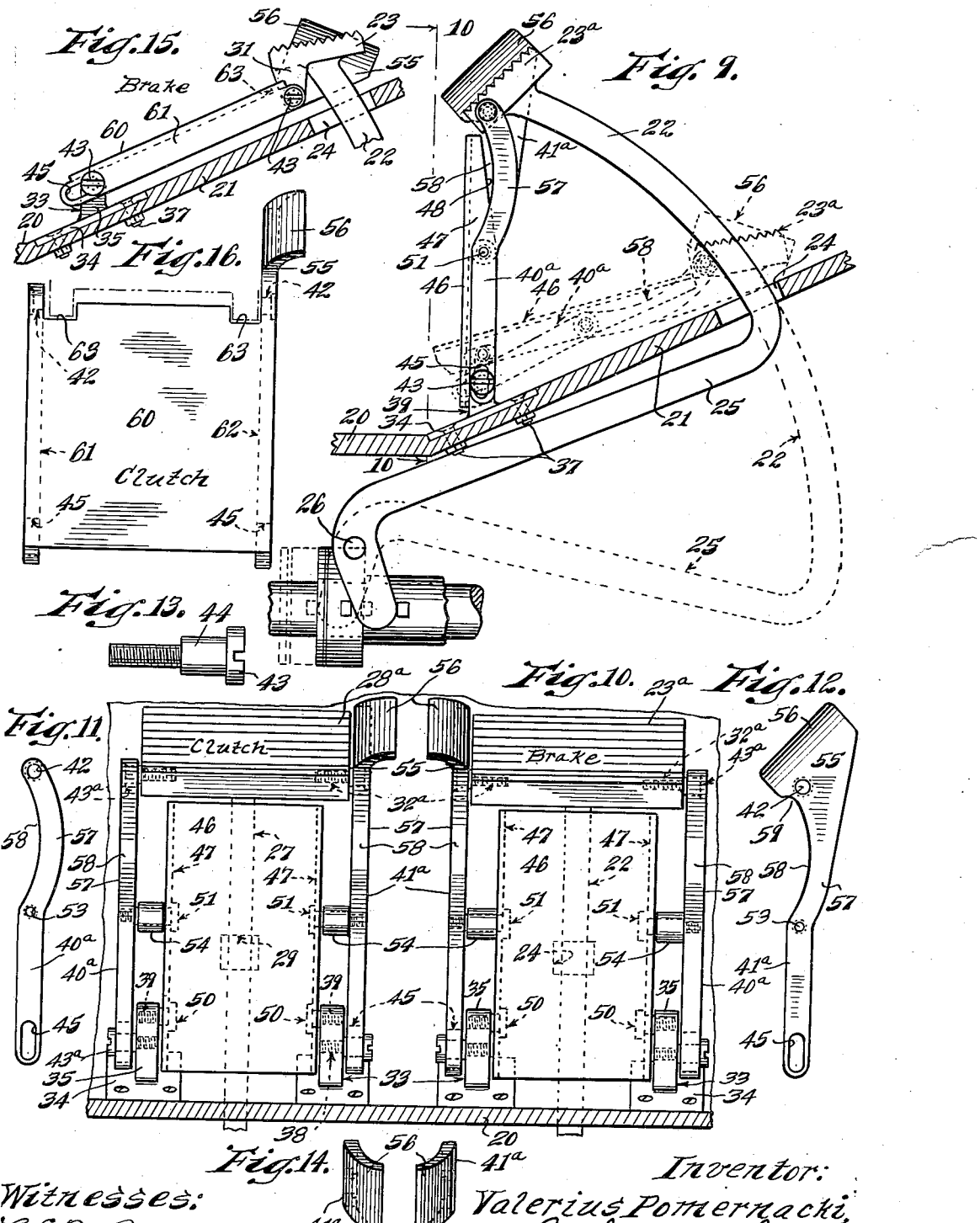

Patented Dec. 17, 1940

2,225,423

UNITED STATES PATENT OFFICE 2,225,423

AUTOMOBILE FOOT PEDAL SAFETY CONTROL

Valerius Pomernacki, Chicago, Ill.

Application September 12, 1939, Serial No. 294,472

17 Claims. (Cl. 74—566)

This invention relates to certain new and useful improvements in an automobile foot pedal safety control and more particularly to an improvement upon the structure shown in my prior Patent Number 2,163,962 dated June 27, 1939, and has reference more particularly to improved means for automatically guiding the feet into proper position on the brake and clutch pedals by which the automobile is controlled so as to simplify driving and minimize accidents.

As is well known, the foot-operated clutch and brake levers of the ordinary automobile project upwardly through openings in the foot-board so that the pedals carried at the upper ends of these levers are positioned side by side and at a considerable distance above the foot-board when in their uppermost positions.

In the process of driving the car, the driver must intermittently shift his right foot from the accelerator pedal to the brake pedal, and back again, and since the accelerator pedal is usually positioned rather closely adjacent to the footboard, while the brake pedal (when in its released or uppermost position) is at a considerably higher level, there is a possibility of catching the foot beneath the brake pedal. This is especially true when the driver is careless or inexperienced, or when the foot must be shifted quickly in a sudden emergency. Also, it is undesirable for the driver to "ride" the clutch, that is, to keep his foot constantly on the clutch pedal, and the better drivers will ordinarily rest the left foot on the foot-board adjacent the clutch pedal, or on the floor board at some location to the rear of the pedal. When it becomes necessary to suddenly replace the left foot on the clutch pedal, there is danger of catching this foot beneath the pedal. There is also the possibility of shifting one or the other of the feet laterally onto the wrong pedal. These mistakes in properly positioning the feet on the pedals are often the cause of accidents, and the present invention is designed to minimize this danger.

Briefly described, the present invention comprises guide members, plates, side members, flanges, guide portions or links pivotally mounted between or secured to and movable with the pedals at opposite sides thereof, instead of merely at the outsides as in my prior patent. By this means, these guide plates will serve to guide the feet on to the brake and clutch pedals and prevent the same from being caught beneath the pedals. They also are so arranged as to swing with the pedals but do not extend through the footboard or beneath the same, and consequently the construction is simplified and the cost of installation made more economical as well as being less likely to get out of working order. The parts are pivotally mounted on posts mounted on the footboard and project upwardly and rearwardly for pivotal movement with the pedals and in such a manner as to extend toward the pedals and properly separate the feet and maintain them on respective pedals.

Another object of the invention is to provide a safety guide means and in addition a stop or bumper plate for each pedal so as to prevent the foot from riding under the pedals at the toes and front of the pedals or from being caught at the front edges thereof as well as serving as a name plate and rendering the device more attractive and ornamental in character.

Another object of the invention is to provide means to prevent the feet from shifting from one pedal to another as well as to guide the foot on to the respective pedals in a simple and efficient manner, said guide member and means being attached to and movable with the pedal of a foot operated control lever so as to automatically direct the foot into position on the pedal and to prevent lateral movement of a foot from one pedal to another.

Other objects and advantages of this invention will be more apparent from the following detailed description of preferred forms or types of apparatus designed and operating according to the principles of this invention. In the accompanying drawings:

Fig. 1 is a partial vertical section taken in a plane between the accelerator and brake pedals and parallel to the longitudinal center line of the car;

Fig. 2 is a front elevation or face view, partly in section, taken on the line 2—2 of Fig. 1;

Fig. 3 is a side elevation of a pivot post;

Fig. 4 is a plan view of Fig. 3;

Figs. 5 and 6 are side elevations of links;

Fig. 7 is a rear elevation of bumper or stop plate;

Fig. 8 is a section taken on the line 8—8 of Fig. 7;

Fig. 9 is a view similar to Fig. 1 of a modification;

Fig. 10 is a view similar to Fig. 2 of said modification taken on the line 10—10 of Fig. 9;

Figs. 11 and 12 are views similar to Figs. 5 and 6 of the modification;

Fig. 13 is a stud or pivot bolt;

Fig. 14 is a top plan view of the adjacent inside links and foot guide or deflector;

Fig. 15 is a fragmentary side elevation of a further modification; and

Fig. 16 is a front plan view of the form shown in Fig. 15.

Referring to Figs. 1 to 8 inclusive, there is shown in Fig. 1 a portion of a car structure in vertical section taken in a plane between accelerator and brake pedals and parallel to the longitudinal center line of the car, the accelerator pedal being omitted. The car structure shown comprises the floor board 20 and foot board 21 while 22 designates the brake lever and 23 the foot pedal thereof which operates above the foot board 21 while the angularly bent brake lever 22 operates through an opening or slot 24 in the foot board and includes a rearwardly and downwardly extending portion 25 pivoted at 26. The foot operated controls for the brakes and clutch are of the usual or any preferred construction. The clutch lever is designated at 27 and the foot pedal thereof at 28, the lever operating through an opening 29 in the foot board corresponding to the opening 24 and the rearwardly extending portion 30 thereof being in substantialy all respects similar to the brake lever and pedal hereinabove described and swinging about the same axis. The brake and clutch levers and also the pedals thereof are positioned side by side but spaced a short distance apart and the usual accelerator or gas pedal (not shown) is located in the customary manner at the right of the brake pedal and usually more closely adjacent the foot board and floor board than the brake and clutch pedals, but preferably in a plane parallel to the latter and slightly below the same, although it may be located in line therewith, above the same or in any other suitable arrangement desired. The lever and pedal combinations, as already described, except for the specific construction of the brake and clutch pedals, are old and common in the art, and it will be understood that the exact form, size and inclination of these pedals vary somewhat in different types of motor cars or automobiles, but in general the relative arrangement is substantially as shown and described.

In accordance with the present invention, the brake and clutch pedals are provided at their opposite ends near their lower or forward edges in view of their inclined position, with depending and forwardly inclined apertured lugs or ears 31 formed integral or attached thereto and preferably having the apertures 32 thereof tapped or threaded. Immediately beneath said lugs and secured to the foot board 21, preferably countersunk therein, are the base plates of brackets 33, the plates 34 of which are inclined. While these plates are shown flush with the foot board, they may be otherwise suitably mounted. The brackets are provided with upright pivot posts 35, while the base plates are inclined to correspond with the foot board and thus form an acute angle at the top and an obtuse angle at the bottom. Apertures 36, preferably four in number, are provided through the base plates and take screws or bolts 37 constituting fastening means for securing the pivot posts to the foot board. Each post is provided with an intermediate or lower tapped aperture 38 horizontaly therethrough and a similar upper aperture 39. Outer bars or links 40 and inside bars or links 41 are provided with upper apertures 42 to receive shoulder screws 43, the threaded portions of which are engaged with the apertures 32 in the lugs 31 so that the annular shoulders thus formed are positioned outwardly of the lugs and the enlarged portions 44 of the screws are smooth and free to turn in the apertures 42. The lower end portions of the bars or links 40 and 41 are provided with elongated slots 45 extending lengthwise of the links to receive similar screws 43 mounted in the same manner and adapted to permit the lower ends of the links to slide thereon. A stop or bumper plate 46, which is flat and may be used as a name plate or made ornamental for aesthetic purposes, is vertically positioned between each pair of bars or links 40 and 41 with its upper end fitting between the lugs 31 and has opposite side flanges 47 extending rearwardly and having upper beveled portions 48 forming tapered portions and lower longitudinal elongated slots 49 to slide on similar but shorter screws 50 at the enlarged portions of the latter and threaded into the holes 39 leaving the plates free to turn as well as slide thereon. Screws 51 are mounted through apertures 52 in the flanges of the plates 46 at opposite sides and intermediately of the lengths thereof above the slots 49 in horizontal alignment with tapped holes 53 intermediately of the lengths of the bars or links 40 and 41 to take the screws 51 to permit the plates to turn thereon, while the links and plates to turn thereon about an axis different, and as shown, smaller than the screws 43 and having collars 54 between the flanges of the plates and the links in the spaces thus provided and constituting spacing means therebetween. The links and plates are thus free to turn relatively on the pivots 51 on opposite sides of the spacing collars 54 as shown in Fig. 1 and each inner bar or link is provided on the upper end thereof with a top wing or guide plate 55 extending above the pedals with the opposed ends 56 thereof curved inwardly toward each other in the manner shown in the drawings so as to guide the feet over the foot pedals, should the feet be inaccurately placed with reference to the brake and clutch pedals. The beveled formation 48 of the plates permit the latter to swing down close to the foot board 21 when the pedals are depressed to apply the brakes or release the clutch as will be understood.

In the operation of the construction shown and described above, when the foot pedal is in a normally raised position, the links and plates are substantially vertical with the axes of the various pivots in alinement but upon the depression of a foot pedal and its lever from the full line position shown in Fig. 1 to the dotted line position shown therein, the lever will swing on the axis 26 and the links and plate will move on the pivot connections and on the pivots 43 and 50 respectively as axes but on shorter radii than the lever to the dotted line position shown in Fig. 1. During this movement, the slots 45 and 49 will permit the bars and plate to ride on the respective pivots, allowing the necessary sliding movements of the links and plate to permit the parts to assume the relative positions illustrated, when the links extending substantially to the foot board 21 and the plate disposed in intersecting relation to the links are swung outwardly to a slightly greater degree toward the horizontal but returning to vertically aligned position when the pedal is released. In this position, the feet cannot pass beneath the pedals but will be guided or stopped by the bars and plates to insure placing of the feet upon the pedals and guided by the curved wings or deflecting portions 56. Should the heel strike the plate, the foot will also be accurately directed and guided onto the pedal with the heel engaging the plate and extending beneath the bottom edge of the pedal to prevent displacement of the foot with respect thereto, especially in view of the obtuse angle relation of the bottom edge of the pedal with respect to the vertical bars or links and plate.

In Figs. 9 to 14 inclusive of the drawings, the construction is the same as previously described, except that the lugs 31 are omitted and the opposite sides of the foot pedals 23a and 28a are provided with tapped holes or sockets 32a to take similar screws 43a pivotally connecting the bars or links 40a and 41a to the pedals in corresponding relation as heretofore described. In addition, the links 41a are provided with forwardly curved portions 57 offset as shown to provide recesses 58 immediately beneath the pivots 43a and above the intermediate pivot 51. The recesses 58 though preferably concave, as shown, may be of other suitable form and are provided with notches 59 immediately beneath the wings 55 of the links 41a to catch the heel and prevent the feet slipping over the wings in addition to guiding the feet over the pedals in the same manner as previously described. Otherwise, the operation of this form of device is exemplified by the full and dotted line positions shown in Fig. 9 of the drawings as substantially the same as described in connection with Fig. 1.

In Figs. 15 and 16 of the drawings, another modification is shown in which instead of forming the bars or links and plates separately, they are formed in one piece. In this instance, the plates are designated at 60 and provided with similar forwardly extending bars or links in the form of side members, guide portions or flanges 61 and 62 on the opposite edges thereof quite similar to plates 46 and flanges 47 in Figs. 7 and 8, produced by pressing, stamping, diecasting, or otherwise and corresponding to the bars or links 40 and 41 or 40a and 41a and made straight or curved, as preferred. The bars or flanges 61 and 62 forming the links as described extend above and below the plates, as do the bars or links when separately formed and these flanges forming links as described are provided with similarly related apertures and slots as described in connection with said bars or links with reference to Figs. 1 to 14 inclusive. Also, the holes 52 and 53 are omitted due to the one piece construction, together with the screws 51 and collars 54. Recesses 63 are provided in the top edge of the plate adjacent each flange 61 and 62 to take the lugs or ears 31 of the foot pedals. The lower slots 45 in the bars 61 and 62 permit the parts to fold downwardly when the pedals are depressed, the slots permitting the necessary sliding movements of the plates and flanges or links over the pivots or pins 43 due to the variation in the arcs swung by the foot levers and plates or links as previously described and as will also be apparent from Fig. 15 of the drawings.

According to the present invention, the wings or plates 55 and their curved portions 56 in addition to serving to help direct the feet into proper position on the respective pedals 23 and 28, will also serve to prevent the feet from slipping laterally or sidewise from one pedal over and on to the other, that is to the left from the brake pedal or to the right from the clutch pedal or from stradding both pedals and should the feet strike the guide links at either side of a pedal, said links will act as guide plates or bars to help direct the feet in an upwardly sliding motion on to the respective pedals. This is particularly true with respect to the brake pedal where the foot is shifted from the accelerator pedal and slightly below the same in closer relation to the foot board. In removing the foot from the accelerator pedal and placing the same on the brake pedal the right foot will be lifted from the former and will ride along the right hand edge of the plate 46 which may project out as seen in Figs. 1 and 9, or along the flange, bar or link 40 of the brake pedal and can be slid upwardly along the link or guide bar until the foot passes on to the brake pedal 23. If the foot is moved over to the limit or so far to the left, it will engage the extension plate or wing 55, thus insuring that the foot will remain on the brake pedal. The left foot is normally on the floor or foot board and may be guided up either of the side links or guide bars, especially the left flange, bar or link 40 and on to the clutch pedal in the same manner as described in connection with the brake pedal and prevented from slipping too far to the right by the corresponding extension plate 55 of the right hand flange, bar or link 41 of the clutch pedal, thereby insuring that the left foot will remain on the clutch pedal and the top surface thereof. Moreover, in practice, the driver may learn to rely to some extent upon the guide plates, flanges, or links, so that in an emergency both feet can be lifted and drawn toward one another but still prevented from moving too far toward each other to prevent their displacement from the respective pedals by the upwardly projecting guards produced by the extension plates 55. The curved portions 56 of the latter will also insure that the feet will be deflected and guided on to the respective pedals if placed too far to the left of the brake pedal or to the right of the clutch pedal, thus insuring safety in driving especially to the beginner but also to the experienced driver who will become accustomed to the use of the improvements as shown and described and by intuition avoid inaccurate placing of the feet. In this way catching of the shoes beneath the control pedals will be entirely avoided and serious mistakes and accidents resulting therefrom prevented. Of course, the plates 55 will serve as stops between the respective foot pedals 23 and 28 in upper or lower positions or any intermediate positions to serve the same functions and advantages already described. It is to be understood that the parts will vary in relative positions, sizes and angles in different cars but the present device may be accommodated to either and will not interfere with the operation of the acceleration pedal or the starter button which is usually positioned above and forwardly of the accelerator pedal. Also, adjustments may be provided for where desired but the parts will be firmly connected for free pivotal action and to compensate for all variations in the arcs swung by the various parts due to the different radii on which the same operate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. An automobile foot pedal safety control including a plate pivotally mounted and extending between the foot pedal to the foot board on a car provided with the pedal and occupying the space beneath the latter and between the sides thereof, bars at the sides of the plate and a guard plate at the top of at least one of said bars.

2. An automobile foot pedal safety control including a plate pivotally mounted to extend between the foot pedal and to the foot board on a car provided with the pedal, bars at the sides of the plate pivoted to the foot pedal and the foot board and a plate at the top of at least one of said bars, curved away from the pedal.

3. In combination with a foot operated control lever of an automobile having a pedal and operating through a foot board, guide bars pivotally connecting the pedal and the board, the guide bar at one side having a top enlargement curved away from the pedal.

4. In combination with a foot operated control lever of an automobile having a pedal and operating through a foot board, guide bars pivotally connecting the under side of the pedal near the rear thereof and the board, said guide bars having a compensating pivot connection near the lower ends thereof to the foot board permitting swinging movement thereof in an arc different from that of the lever.

5. In combination with a foot operated control lever of an automobile having a pedal and operating through a foot board, guide bars pivotally connecting the pedal and the board, said guide bars having sliding connection at the pivot adjacent the foot board and moving in an arc having a smaller radius than the lever.

6. In combination with a foot operated control lever of an automobile having a pedal and operating through a foot board, guide bars pivotally connecting the forward edge of the pedal and the board, said guide bars being pivoted near the bottom adjacent the foot board eccentrically relative to the lever, and a plate between the bars.

7. In combination with a foot operated control lever of an automobile having a pedal and operating through a foot board, guide bars pivotally connecting the pedal and the board, a guide plate at the upper end of a bar, said guide plate and the pedal being located in a plane at obtuse angles to the bars.

8. In combination with a foot operated control lever of an automobile having a pedal and operating through a foot board, guide bars pivotally connecting the pedal near its forward edge and the board, said guide bars having a movable pivotal connection supported at the foot board and disposed between the pedal and the foot board.

9. In combination with a foot operated control lever of an automobile having a pedal and operating through a foot board, guide bars pivotally connecting the pedal and the board, and a plate having side flanges pivoted between the bars and adjacent the foot board, said bars and plate having sliding connection at the pivots adjacent the foot boards.

10. In combination with a foot operated control lever of an automobile having a pedal and operating through a foot board, guide bars pivotally connecting the pedal and the board, and a plate pivoted between the bars and vertically positioned between the foot board and the pedal.

11. In combination with a foot operated control lever of an automobile having a pedal and operating through a foot board, guide bars pivotally connecting the pedal and the board, and a plate pivoted between the bars and vertically positioned between the foot board and the pedal, said bars having rearwardly offset portions adjacent the foot pedal.

12. In combination with a foot operated control lever of an automobile having a pedal and operating through a foot board, guide bars pivotally connecting the pedal and the board, and a plate between the bars and vertically positioned between the foot board and the pedal, the pivotal connections of the bars with the foot pedal being below the latter.

13. In combination with a foot operated control lever of an automobile having a pedal and operating through a foot board, guide bars pivotally connecting the pedal and the board, a plate between the bars and means slidably and pivotally separating the bars and plate adjacent the foot board.

14. The combination with the clutch and brake pedals of an automobile having levers pivoted between the floor and foot boards of the automobile, plates pivoted between the pedals and foot board, guides at the sides of the plates, the upper ends of the inner guides extending above the pedals and curved toward each other.

15. The combination with the clutch and brake pedals of an automobile having levers pivotally mounted beneath the floor and foot boards of the automobile, plates pivotally mounted and extending between the pedals and foot board, guides at the sides of the plate, the upper ends of the inner guides extending above the pedals and curved toward each other, brackets pivotally and slidably connecting the plates to the foot board, said plates and guides having the pivotal connections thereof in alignment.

16. An automobile foot pedal safety control comprising in combination with the foot board and the pedal having a lever pivoted below the foot board, an abutment member forming a guide member pivoted beneath the pedal near its rear edge and extending downwardly in close proximity to the foot board, and means fixedly supported on the foot board to pivotally and slidably mount the lower end of the abutment member to swing on a horizontal axis.

17. The combination with a foot operated control lever of an automobile having a pedal and operating through the foot board of the automobile, a vertical guide and abutment member pivoted to the pedal and a fixed support on the foot board to extend between the pedal and the foot board.

VALERIUS POMERNACKI.